P. M. BREVIG.
PIPE UNION.
APPLICATION FILED APR. 7, 1917.

1,281,498.

Patented Oct. 15, 1918.

WITNESSES

INVENTOR
Peter M. Brevig.

BY

ATTORNEY

UNITED STATES PATENT OFFICE.

PETER M. BREVIG, OF RAMSAY, MICHIGAN.

PIPE-UNION.

1,281,498.  Specification of Letters Patent.  Patented Oct. 15, 1918.

Application filed April 7, 1917. Serial No. 160,526.

*To all whom it may concern:*

Be it known that I, PETER M. BREVIG, a citizen of the United States, residing at Ramsay, in the county of Gogebic and State of Michigan, have invented certain new and useful Improvements in Pipe-Unions, of which the following is a specification.

This invention relates to a pipe coupling and the principal object of the invention is to provide a device of this character that will permit a quick and easy repair in a pipe system without having to call in a skilled mechanic, and where only a few tools are at hand.

A further object of the invention is to provide means for connecting pipes together where the threads have been broken off of either one or both pipes.

A further object of the invention is to provide means whereby the coupling may be applied with an ordinary wrench.

The invention also consists in certain other features of construction and in the combination and arrangement of the several parts, to be hereinafter fully described and specifically pointed out in the appended claims.

In describing my invention in detail, reference will be had to the accompanying drawings wherein like characters denote like or corresponding parts throughout the several views, and in which.

Figure 1:
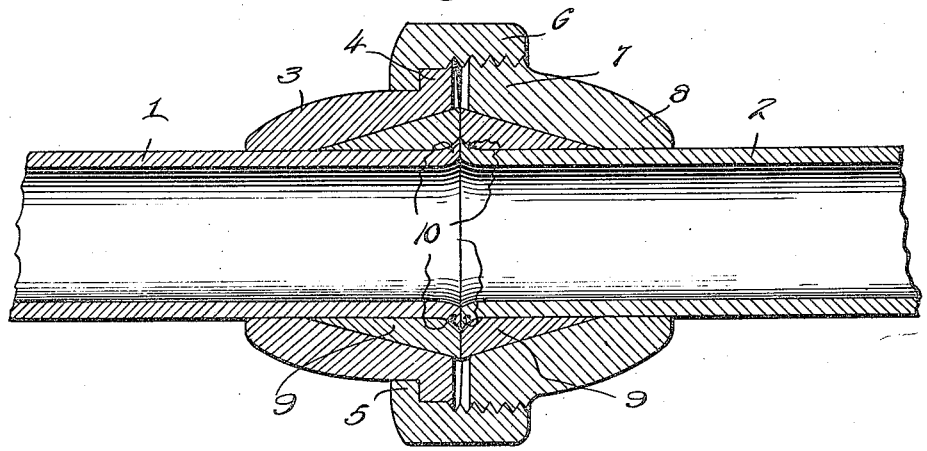
Figure 1 is a sectional view of the invention.

In these drawings, the pipes to be connected together are indicated by the reference numerals 1 and 2. The coupling consists of a member 3 provided with a collar 4, with which engages the collar 5 of a nut 6, and this nut is adapted to engage with the screw threaded cylindrical portion 7 of the member 8 so as to hold the two parts of the coupling together. It will be understood that the nut 6 can be rotated on the member 3 and said nut can be removed therefrom so as to facilitate the packing of the coupling when not in use.

9 is a sleeve, preferably formed of lead, and adapted to be located between the pipe and each member of the coupling, said sleeve being of conical form to conform to the interior walls of the members of the coupling.

When two pipes are to be connected together by my coupling, the members of the coupling are first slipped over the ends of the pipes, the nut 6 being in place on the member 3 and then the lead sleeves are placed in the space between the pipe ends and the coupling.

The pipe ends are then struck with a hammer to upset them against the sleeves, as shown at 10, the metal of the sleeve being forced out somewhat by this hammering action against the coupling. The ends of the pipes with the parts of the coupling thereon are then placed together and the nut screwed on the cylindrical portion 7 so as to force the two sleeves together to make a fluid tight connection between the ends of the pipe.

Figure 2:
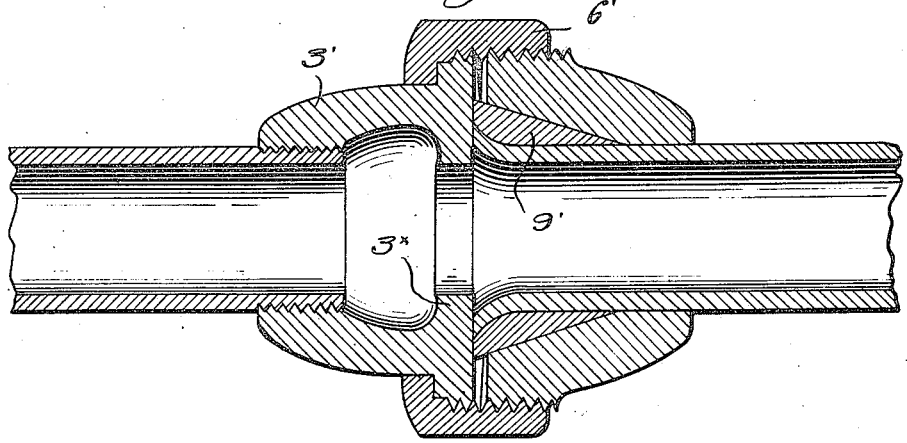
Fig. 2 is a like view, showing a modification.
Figure 3:
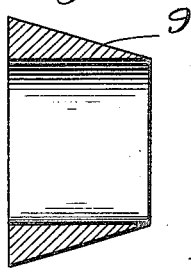
Fig. 3 is a sectional view of the lead sleeve.

When one of the pipes has the screw threads thereon still intact, the device shown in Fig. 2 may be used. In this case, the member 3' is provided with screw threads to engage the threads on the pipe, and said member is provided with an interior, annular collar 3$^x$, against which the lead sleeve and the upset end of the pipe are placed when the nut 6' is screwed up. As will be seen, only one lead sleeve 9' is used in this construction. In this construction also, the pipes do not need to come together as the coupling will bridge the space between them.

This form of my invention may be used in those cases where it is necessary to cut off a portion of the pipe, owing to its being cracked or broken.

It is thought from the foregoing that the advantages and novel features of my invention will be readily apparent.

I desire it to be understood that I may make slight changes in the construction and in the arrangement and combination of the several parts, provided such changes fall within the scope of the appended claims.

I claim as my invention:

1. A coupling including a pipe having an upset end, a structure having a pipe associated therewith to be joined to the first named pipe, a member adjacent said upset end of said pipe having a conical bore therethrough, a yieldable sleeve having its outer periphery tapered to fit the bore in said member, and means for clamping the structure and said member together so that the broadest portion of said sleeve will abut with said upset portion and the structure to make a water-tight joint beween the pipe.

2. A coupling including a pair of pipes having upset ends, a pair of members each having a conical bore therethrough, a pair of yieldable sleeves having their outer peripheries tapered to fit the bores in said members, and means for clamping the two members together so that the broadest ends of the sleeves will abut and clamp the upset ends of the pipes together.

In testimony whereof I affix my signature in presence of two witnesses.

PETER M. BREVIG.

Witnesses:
MARTIN SHEFPAR,
WM. NOSKI.